United States Patent [19]

Williams

[11] 4,359,204

[45] Nov. 16, 1982

[54] ROD OPERATED VALVE

[75] Inventor: Donald L. Williams, Port Clinton, Ohio

[73] Assignee: General Motors Corporation, Detroit, Mich.

[21] Appl. No.: 204,634

[22] Filed: Nov. 6, 1980

[51] Int. Cl.³ .................. F16K 7/02; F16K 41/10
[52] U.S. Cl. ................... 251/331; 251/335 B; 137/DIG. 4; 137/197
[58] Field of Search ............ 251/331, 335 B; 137/DIG. 4

[56] References Cited

U.S. PATENT DOCUMENTS

| 1,779,503 | 10/1930 | Swindin | 137/375 |
|---|---|---|---|
| 2,668,014 | 2/1954 | Lund | 237/8 A |
| 2,672,293 | 3/1954 | Ludlow | 237/8 A |
| 2,848,169 | 8/1958 | Obermaier | 237/8 A |
| 3,211,416 | 10/1965 | Billeter et al. | 251/331 |
| 3,442,486 | 5/1969 | Serio, Jr. | 251/331 X |

FOREIGN PATENT DOCUMENTS

| 2406341 | 8/1975 | Fed. Rep. of Germany | 251/331 |
|---|---|---|---|
| 524887 | 4/1955 | Italy | 251/331 |

Primary Examiner—Arnold Rosenthal
Attorney, Agent, or Firm—R. L. Phillips

[57] ABSTRACT

A diaphragm actuated-rod operated valve assembly adapted for installation in a fluid flow is disclosed comprising a one-piece elastomeric valve-spring-seal member which is operated by the push rod and has only a static seal and in addition is provided with internal support such as to prevent an otherwise collapsible portion of the valve from grabbing the operating rod as a result of external pressure and thereby inhibiting valve operation.

3 Claims, 6 Drawing Figures

ROD OPERATED VALVE

This invention relates to rod operated valves and more particularly to a rod operated valve assembly having an integral valve, spring and static seal but no dynamic or sliding seal.

Typical rod operated valves require some form of sealing arrangement about the operating rod between the fluid flow and the rod's actuator which may, for example, be a vacuum actuated diaphragm. Where dynamic or sliding sealing is employed, it is difficult to maintain as it will, for example, deteriorate with wear, adverse temperature conditions, etc. and in the case of a vacuum operated diaphragm allow fluid leakage to reach the controlling vacuum chamber and disturb the valve operation. In an effort to eliminate the need for such dynamic or sliding seal arrangements, it has been proposed to form the valve as a hollow elastomeric member with the operating rod extending therethrough blind to the fluid flow. However, in practice this has proved difficult because of fluid flow pressures collapsing the hollow elastomeric portion of the valve on the operating rod thereby inhibiting its valve operating movement.

The rod operated valve assembly according to the present invention overcomes such problem as well as providing other advantages and comprises a unitized valve-spring-seal member of elastomeric material having an integral tubular portion into which the operating rod extends through an open end thereof. The elastomeric member is closed at the opposite end and is internally engaged thereat by the operating end of the rod and has a valve face externally formed thereon adapted to control the fluid flow. For sealing, the tubular portion has an outwardly projecting annular seal flange formed integral therewith at the open end thereof. The seal flange is adapted to be sealingly fixed thereabout in the valve assembly to thereby completely statically seal off fluid communication with the operating rod and its actuator. The elastomeric tubular portion further includes an outwardly projecting annular corrugation extending about the operating rod located intermediate the valve end and the seal flange to thereby provide the tubular portion with a spring portion and a compliance that will normally yieldingly hold the valve face in a desired position (open or closed) and will accommodate the desired movement of the valve face between its open and closed positions. An annular insert of rigid material is located interior of the tubular portion in the corrugation and is slidably received on the operating rod to prevent the tubular portion from collapsing on and grabbing the rod as a result of the external fluid pressure acting on the elastomeric tubular portion. In addition, there is provided a rigid guide member which is secured to the valve housing and extends into the elastomeric tubular portion through its open end and about the rod so as to both guide the rod movement and help support the elastomeric tubular portion from within. There is also provided another rigid insert which is mushroom shaped and reinforces the valve head from within and extends a short way along the interior of the tubular portion and over the operating end of the rod to further add to the internal support of the unitized valve-spring-seal member against the fluid forces operating thereon.

Thus, in the rod operated valve assembly of the present invention there are no dynamic or sliding seals to isolate the rod actuator from the fluid flow, there simply being the static seal formed by the integral annular seal flange which is effected at valve assembly. Moreover, the rigid annular insert located in the corrugation and slidably received on the operating rod permits the compliant spring section of the unitized elastomeric valve-spring-seal member to only be compressively stressed by the external fluid forces engendered by the fluid flow to thereby positively prevent such forces from collapsing the elastomeric tubular portion of the unitized valve-spring-seal member on the operating rod and inhibiting valve operation.

These and other objects and advantages of the present invention will be more apparent from the following description and drawings in which.

Figure 1:
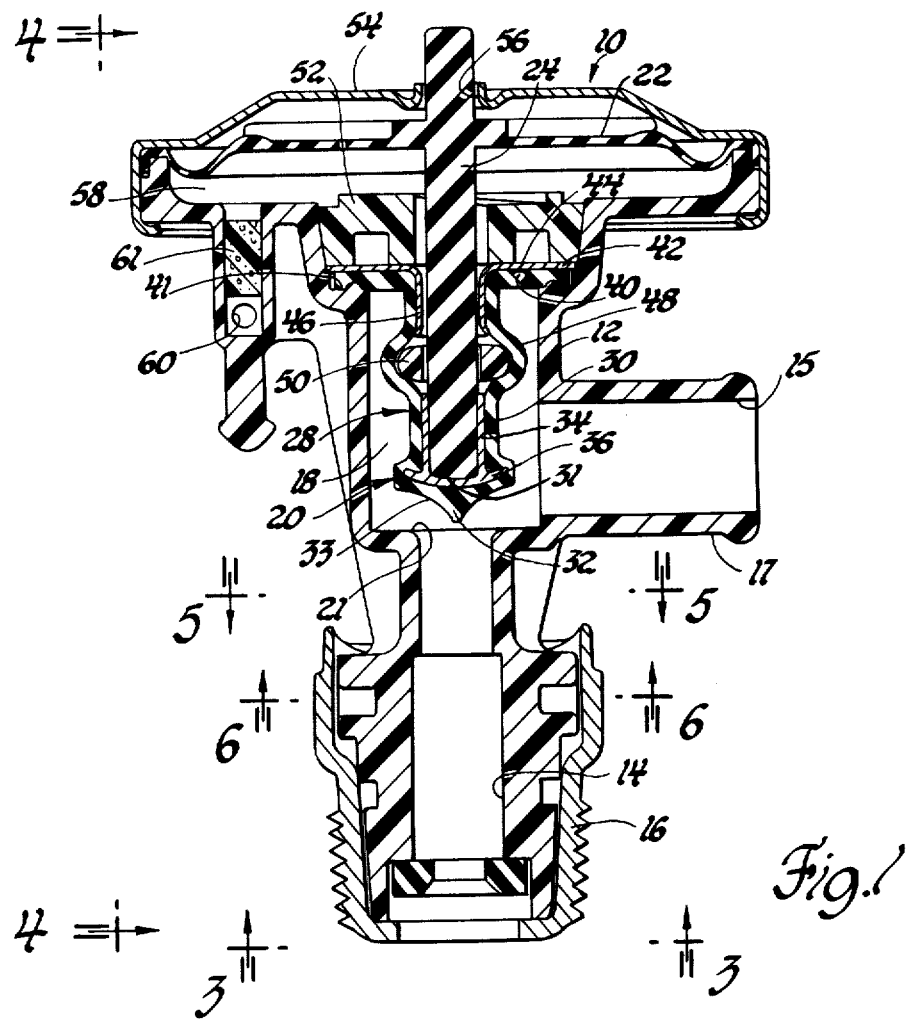
FIG. 1 is a view taken along the line 1—1 in FIG. 4, the latter figure being a side elevational view of the presently preferred embodiment of the valve assembly according to the present invention and the former figure being a cross-sectional view thereof with the valve shown in its open position.
Figure 4:
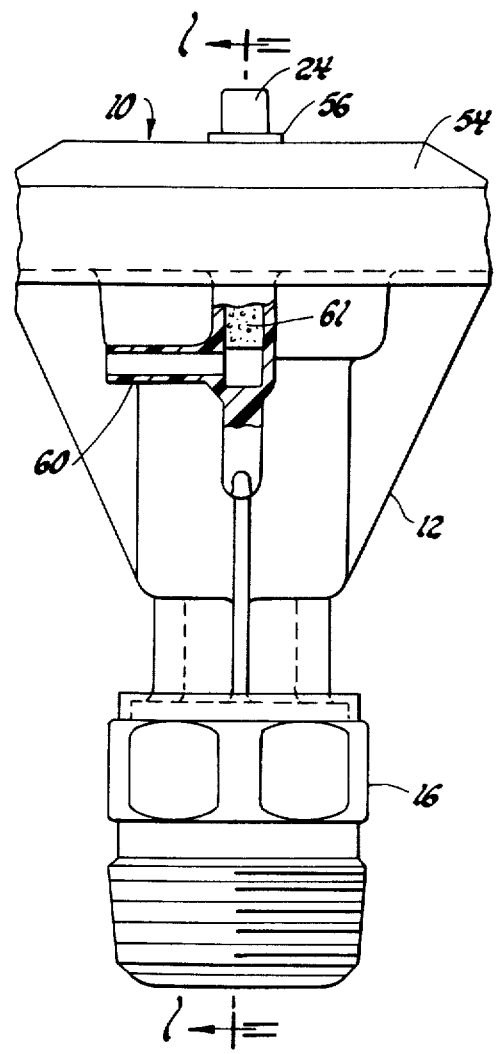
FIG. 4 is a side view taken along the line 4—4 in FIG. 1.

Referring to FIGS. 1 and 4, there is shown a diaphragm actuated-rod operated valve assembly generally designated as 10 having incorporated therein the presently preferred embodiment of the invention as adapted for use as a heater water valve in the air conditioning system (not shown) of a vehicle wherein the diaphragm is vacuum actuated and the valve functions as a simple on-off device inserted in the line connecting the hot water source (engine block) and the heater core. It will be understood that in use, the valve is normally open and that its diaphragm actuator is selectively connected with a vacuum source such as the engine intake manifold so as to be actuated to its shut off condition to shut off hot water to the heater core so that the air conditioner does not have to work against the added heat load.

Figure 2:
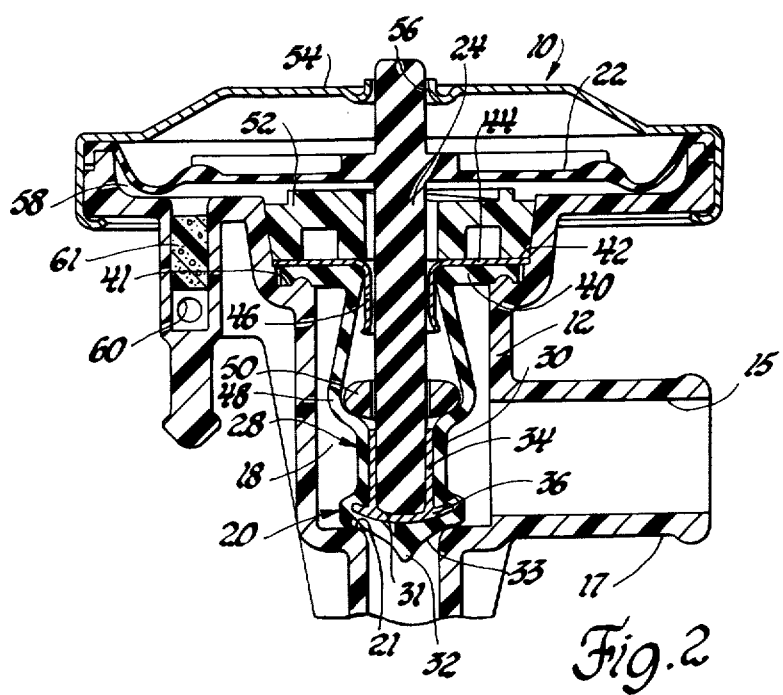
FIG. 2 is a partial cross-sectional view similar to FIG. 1 but showing the valve closed.
Figure 3:
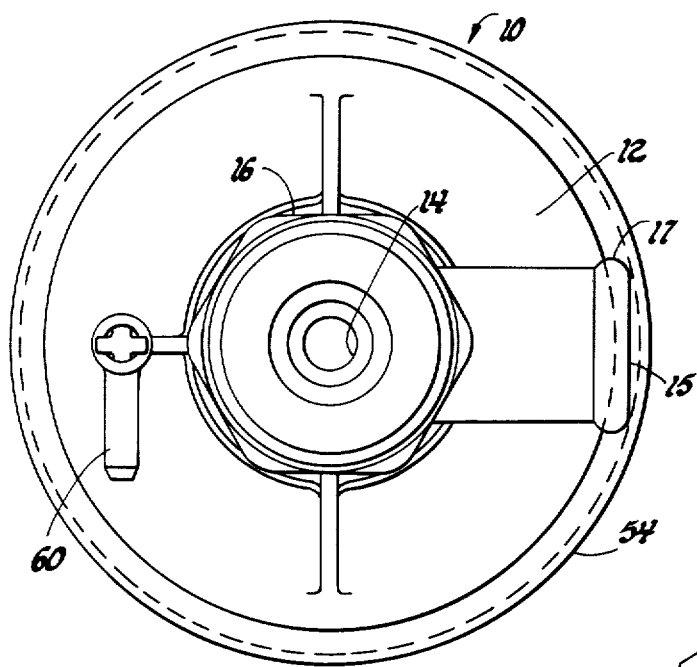
FIG. 3 is a bottom view taken along the line 3—3 in FIG. 1.
Figure 5:
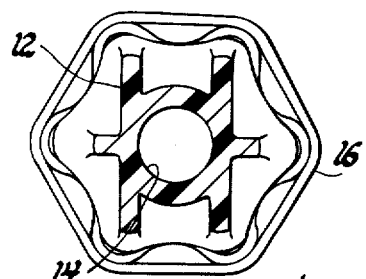
FIG. 5 is a cross-sectional view taken along the line 5—5 in FIG. 1.
Figure 6:
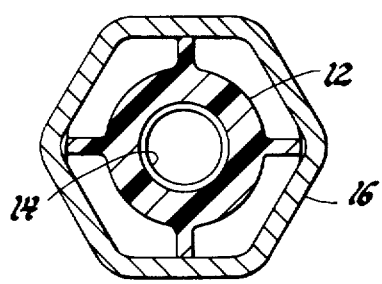
FIG. 6 is a cross-sectional view taken along the line 6—6 in FIG. 1.

Describing now the details of the valve assembly construction, there is a plastic injection molded valve body 12 having an inlet 14 and an outlet 15 at right angles thereto. Assembled to the valve body at its inlet 14 is a threaded male fitting 16 of metal which is crimped thereabout and is adapted to connect the valve at an upstream point in a fluid line, in this case in the line from the engine block. The outlet 15, on the other hand, is formed with a nipple 17 so as to be adapted to receive a hose to connect the valve at a downstream point in the fluid line, in this case to the line to the heater core. The valve body 12 further includes a valve chamber 18 which provides for communication between the inlet 14 and outlet 15 and accommodates a push rod operated valve assembly 20 which in the open position shown in FIG. 1 connects the inlet to the outlet and in the closed position shown in FIG. 2 blocks such connection by engaging a valve seat 21 formed in the valve body where the inlet 14 joins with the valve chamber 18.

The valve assembly 20 comprises a plastic injection molded diaphragm 22 having a centrally located cylindrical push rod or plunger 24 formed integral therewith. A unitized or one-piece valve-spring-seal member 28 injection molded of elastomeric material has a thin wall tubular portion 30 with an open end through which it is received over the push rod 24. The valve-spring-seal member 28 is closed at the other end opposite the operating end 31 of the push rod and has a valve head 32 on which a tapered concave valve face 33 is externally formed thereon that is adapted to engage the rounded valve seal 21. A hollow mushroom shaped rigid reinforcement insert 34 of metal is received over the operating end 31 of the push rod between it and the tubular portion 30 of the valve-spring-seal member 28 and has a crown 36 whose rim extends radially outward into the valve head 32 to help support or reinforce same.

The tubular portion 30 has a radially outwardly projecting annular seal flange or collar 40 formed integral therewith about its open end and thus most remote from the valve head 32. The seat flange 40 extends sufficiently outward so as to engage on its fluid flow side with a singular annular rib seal seat 41 formed in the valve body at this end of the valve chamber 18. A stamped sheet metal rod guide-seal retainer member 42 has an annular radial section or flange 44 which engages the opposite side of the elastic seal flange 40. The rod guide-seal retainer member 42 further has an integral sleeve or bushing 46 which is received about the push rod 24 and extends in close-fitting relationship into the tubular portion 30 to both support same and guide the push rod 24 on this side of the diaphragm 22. The tubular portion 30 further includes an outwardly projecting single corrugation 48 intermediate the valve head insert 34 and rod guide 46 to provide the tubular portion 30 with a spring section and a compliance that will normally yielding hold the valve head 32 in its open position shown in FIG. 1 and accommodate the movement of the valve head to its closed position shown in FIG. 2 on vacuum actuation as described in more detail later. Moreover, a plastic injection molded annular reinforcement insert 50 is located in the corrugation 48 and is slidably received on the push rod 24 to prevent collapsing of the corrugation 48 on the plunger as will also be described in more detail later.

A plastic injection molded cap 52 is received about the push rod 24 between the diaphragm 22 and guide-seal retainer member flange 44 and is spun weld in place to the valve body to hold the guide-seal retainer member and thereby the static seal 40 in sealing contact with the valve body thus completely blocking off fluid connection of the valve chamber 18, inlet 14 and outlet 15 with the diaphragm 22. The push rod 24 also extends a slight way from the opposite side of the diaphragm 22 or upward as shown and there is provided a stamped sheet metal cover 54 which is crimped about its periphery to the valve body and has a centrally located opening with a neck 56 which receives and helps guide the push rod at this end while also venting the upper side of the diaphragm to atmosphere by a relatively loose fit. The cover 54 sealingly clamps the periphery of the diaphragm 22 against the valve body and the latter combination forms a chamber 58 on the underside of the diaphragm which when supplied with vacuum pulls the diaphragm and thus the push rod 24 downward from its normally held open position shown in FIG. 1 to the actuated or closed position shown in FIG. 2. A vacuum source such as the engine intake manifold is connected to the valve's vacuum chamber 58 via a hose nipple 60 which is formed integral with the valve body. For where the fluid being controlled by the valve is liquid as in the case shown, a compressed and dried cellulose sponge plug 61 is mounted in this vacuum connection and in its dry state is sufficiently porous to freely pass the vacuum for the valve actuation. However, it for any reason the liquid in the line being controlled is allowed to enter the vacuum chamber 58 the then wetted plug quickly expands so as to effectively seal the vacuum line thereby precluding the entry of any significant quantity of such liquid into the engine induction system.

With the valve arrangement thus described, it thus can be seen that there are no dynamic or sliding seals required to isolate the valve's actuating chamber 58 from the fluid in inlet 14, chamber 18 and outlet 15, there simply being a single static seal provided by the seal portion 40 of the unitized valve-spring-seal member 28 which is effected at valve assembly. Moreover, the unitized valve-spring-seal member 28 is by virtue of the valve head reinforcement insert 34, the rod guide 46 and especially the donut-shaped reinforcement insert 50 through which the push rod 24 is free to slide entirely internally supported against the external fluid forces acting thereon in the valve chamber 18. As a result, the elastomeric material of the valve can only be compressively stressed due to such fluid forces, in this case the hydrostatic forces, engendered by the fluid flow. Thus, the spring and compliance built into the unitized elastomeric valve spring-seal member 28 to provide for its inherently held position as well as movement to its actuated position is not hindered which could occur for example if the donut-shaped insert 50 was not there to directly prevent the corrugated tubular portion 48 from collapsing on and grabbing the push rod and thereby inhibiting its movement and thus valve operation.

The above-described presently preferred embodiment is illustrative of the invention which may be modified within the scope of the appended claims.

The embodiments of the invention in which an exclusive property or privilege is claimed are defined as follows:

1. In a rod operated valve assembly adapted for installation in a fluid flow line, a unitized valve-spring-seal member of elastomeric material having a tubular portion received over the rod, said tubular portion being closed at only one end opposite an operating end of the rod and having a valve head with a valve face externally formed thereon adapted to control the fluid flow, said tubular portion having an outwardly projecting annular seal flange formed integral therewith and extending thereabout at a location remote from said valve head, said seal flange being adapted to be sealingly fixed thereabout in the valve assembly to thereby completely seal off fluid communication from the line with the rod and its actuator, said tubular portion including a single outwardly projecting corrugation extending about the rod and located intermediate said closed end and said seal flange to thereby provide said tubular portion with an elastic spring section and a compliance that will normally yieldingly hold said valve head in an open position and accommodate movement of said valve head to a closed position, and a single annular member of rigid material located in said corrugation and directly slidably mounted on said rod for preventing said tubular portion from collapsing and grabbing said rod as the result of external fluid pressure acting thereon.

2. In a rod operated valve assembly adapted for installation in a fluid flow line, a unitized valve-spring-seal member of elastomeric material having a tubular portion received over the rod, said tubular portion being closed at only one end opposite an operating end of the rod and having a valve head with a valve face externally formed thereon adapted to control the fluid flow, said tubular portion having an outwardly projecting annular seal flange formed integral therewith and extending thereabout at a location remote from said valve head, said seal flange being adapted to be sealingly fixed thereabout in the valve assembly to thereby completely seal off fluid communication from the line with the rod and its actuator, said tubular portion including a single outwardly projecting corrugation extending about the rod and located intermediate said closed end and said seal flange to thereby provide said tubular portion with an elastic spring section and a compliance that will normally yieldingly hold said valve head in an open position and accommodate movement of said valve head to a closed position, a single annular member of rigid material located in said corrugation and directly slidably mounted on said rod for preventing said tubular portion from collapsing and grabbing the rod as the result of external fluid pressure acting thereon and a rod guide-seal retainer member having an integral flange retaining said seal flange in place and further having an integral bushing both receiving and guiding the rod and extending into said tubular portion to internally support same against external fluid pressure acting thereon and thereby assist said annular member in preventing said tubular portion from collapsing and grabbing the rod as the result of external fluid pressure acting thereon.

3. In a rod operated valve assembly adapted for installation in a fluid flow line, a unitized valve-spring-seal member of elastomeric material having a tubular portion received over the rod, said tubular portion being closed at only one end opposite an operating end of the rod and having a valve head with a valve face externally formed thereon adapted to control the fluid flow, said tubular portion having an outwardly projecting annular seal flange formed integral therewith and extending thereabout at a location remote from said valve head, said seal flange being adapted to be sealingly fixed thereabout in the valve assembly to thereby completely seal off fluid communication from the line with the rod and its actuator, said tubular portion including a single outwardly projecting corrugation extending about the rod and located intermediate said closed end and said seal flange to thereby provide said tubular portion with an elastic spring section and a compliance that will normally yieldingly hold said valve head in an open position and accommodate movement of said valve head to a closed position, a single annular member of rigid material located in said corrugation and directly slidably mounted on said rod for preventing said tubular portion from collapsing and grabbing the rod as the result of external fluid pressure acting thereon, a rod guide-seal retainer member having an integral flange retaining said seal flange in place and further having an integral bushing both receiving and guiding the rod and extending into said tubular portion to internally support same against external fluid pressure acting thereon and thereby assist said annular member in preventing said tubular portion from collapsing and grabbing the rod as the result of external fluid pressure acting thereon and a rigid hollow insert received over the operating end of the rod and in said closed end of said tubular portion to both reinforce said valve head and internally support said tubular portion against external fluid pressure acting thereon and thereby assist said annular member and said bushing in preventing said tubular portion from collapsing and grabbing the rod as the result of external fluid pressure acting thereon.

* * * * *